US012238467B2

(12) United States Patent
Ding et al.

(10) Patent No.: US 12,238,467 B2
(45) Date of Patent: Feb. 25, 2025

(54) SPEAKER BOX

(71) Applicant: AAC TECHNOLOGIES (NANNING) CO., LTD., Nanning (CN)

(72) Inventors: Jianhua Ding, Shenzhen (CN); Shuwen Wu, Shenzhen (CN); Guoxiu Feng, Shenzhen (CN); Mushu Xiao, Shenzhen (CN)

(73) Assignee: AAC TECHNOLOGIES (NANNING) CO., LTD., Nanning (CN)

( * ) Notice: Subject to any disclaimer, the term of this patent is extended or adjusted under 35 U.S.C. 154(b) by 0 days.

(21) Appl. No.: 17/920,011

(22) PCT Filed: Jul. 20, 2022

(86) PCT No.: PCT/CN2022/106642
§ 371 (c)(1),
(2) Date: Oct. 19, 2022

(87) PCT Pub. No.: WO2024/000683
PCT Pub. Date: Jan. 4, 2024

(65) Prior Publication Data

US 2024/0267660 A1 Aug. 8, 2024

(30) Foreign Application Priority Data

Jun. 30, 2022 (CN) ......................... 202221690877.4

(51) Int. Cl.
*H04R 1/02* (2006.01)
*H04R 9/06* (2006.01)

(52) U.S. Cl.
CPC ............... *H04R 1/025* (2013.01); *H04R 9/06* (2013.01); *H04R 2400/11* (2013.01)

(58) Field of Classification Search
None
See application file for complete search history.

(56) References Cited

U.S. PATENT DOCUMENTS

2022/0201384 A1* 6/2022 Ren ........................ H04R 1/021

FOREIGN PATENT DOCUMENTS

CN 215818485 U 2/2022

OTHER PUBLICATIONS

English language translation of CN215818485. (Year: 2022).*

* cited by examiner

*Primary Examiner* — Paul W Huber
(74) *Attorney, Agent, or Firm* — W&G Law Group

(57) ABSTRACT

A speaker box includes a metal housing defining an accommodating cavity, a speaker received in the accommodating cavity, and at least two metal pieces arranged between the metal housing and the speaker. The speaker includes a vibrating diaphragm. The speaker includes a frame and a magnetic yoke fixed to the frame. The at least two metal pieces are welded and fixed to the magnetic yoke and the metal housing. Compared with the prior art, by welding the at least two metal pieces with the speaker through laser, reliability of the speaker box is improved when the speaker box suddenly drops, a manufacturing process is optimized, and costs are saved.

7 Claims, 4 Drawing Sheets

SPEAKER BOX

TECHNICAL FIELD

The present disclosure relates to a field of electro-acoustic conversion, and in particular to a speaker box.

BACKGROUND

A speaker is a sound-producing device used in electronic devices (such as mobile phones, tablet computers, learning machines, MP4, etc.). In the prior art, there is a type of speaker that adopts a metal housing. However, due to limitations of a structure of the metal housing and structures of the electronic devices, the metal housing lacks positioning and fastening structures to match with the electronic devices. As a result, after long-term use, a speaker unit in the speaker is easy to loosen, which affects a sound quality of the speaker. Therefore, the speaker is unable to stably and reliably output high-quality sound and there are limitations in an application of the speaker with the metal housing in the electronic devices.

In the prior art, the speaker unit is first fixed to the metal housing through a support foam, and then a speaker shell of the speaker and the speaker unit are fixed by gluing, which is complicated and unreliable.

Therefore, it is necessary to provide a speaker box to solve above technical problems.

SUMMARY

A purpose of the present disclosure is to provide a speaker box with high reliability and good stability.

To achieve the above purpose, the present disclosure provides a speaker box. The speaker box comprises a metal housing defining an accommodating cavity, a speaker received in the accommodating cavity, and at least two metal pieces arranged between the metal housing and the speaker. The speaker comprises a vibrating diaphragm. The speaker comprises a frame and a magnetic yoke fixed to the frame. The at least two metal pieces are welded and fixed to the magnetic yoke and the metal housing.

Optionally, two metal pieces are provided. The two metal pieces are arranged on two opposite sides of the speaker along a short axis direction of the speaker.

Optionally, the metal housing comprises an upper housing close to the vibrating diaphragm and a lower housing away from the vibrating diaphragm. The upper housing comprises a first side wall arranged parallel to a vibration direction of the vibrating diaphragm. Each of the two metal pieces comprises a main body portion and an extending portion. Each main body portion is at least partially arranged between the speaker and the first side wall. Each extending portion bends inwardly from one side of a corresponding main body portion away from the vibrating diaphragm. Each extending portion is fixed on a lower surface of the magnetic yoke away from the vibrating diaphragm. Each main body portion is fixedly connected to the first side wall.

Optionally, the lower housing comprises a second side wall connected to the first side wall. Each main body portion is fixedly connected to the second side wall.

Optionally, each main body portion is parallel to the vibration direction of the vibrating diaphragm. Each extending portion is perpendicular to the vibration direction of the vibrating diaphragm.

Optionally, each main body portion comprises a first surface fixed to the magnetic yoke.

Optionally, the upper housing further comprises a top wall bent and extended inwardly from one side of the first side wall away from the second side wall along a direction perpendicular to the vibration direction of the vibrating diaphragm. The top wall comprises an upper surface close to the vibrating diaphragm. The upper surface of the top wall is perpendicular to the vibration direction of the vibrating diaphragm. Each main body portion comprises an end surface arranged opposite to the upper surface of the top wall. The end surface of each main body portion is fixedly connected to the upper surface of the top wall.

Optionally, the at least two metal pieces are made of steel.

Compared with the prior art, the speaker box of the present disclosure comprises the at least two metal pieces and the at least two metal pieces are welded and fixed with the metal housing and the magnetic yoke of the speaker, so that the speaker and the metal housing are firmly fixed. Compared with the prior art, a support foam configured to support the speaker is eliminated, which optimizes a manufacturing process and saves costs. By welding the metal housing with the speaker through laser, reliability of the speaker box is improved when the speaker box suddenly drops.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor. In the drawing.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Figure 1:
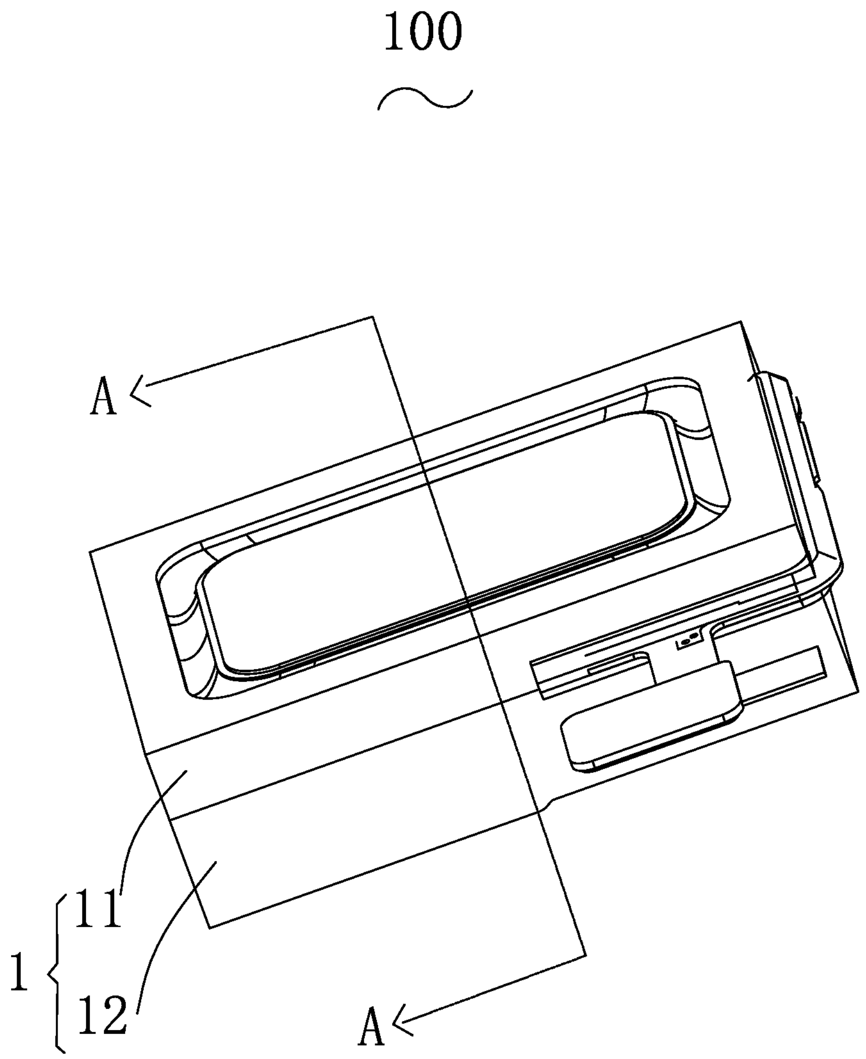
FIG. 1 is a perspective schematic diagram of a speaker box of the present disclosure.
Figure 2:
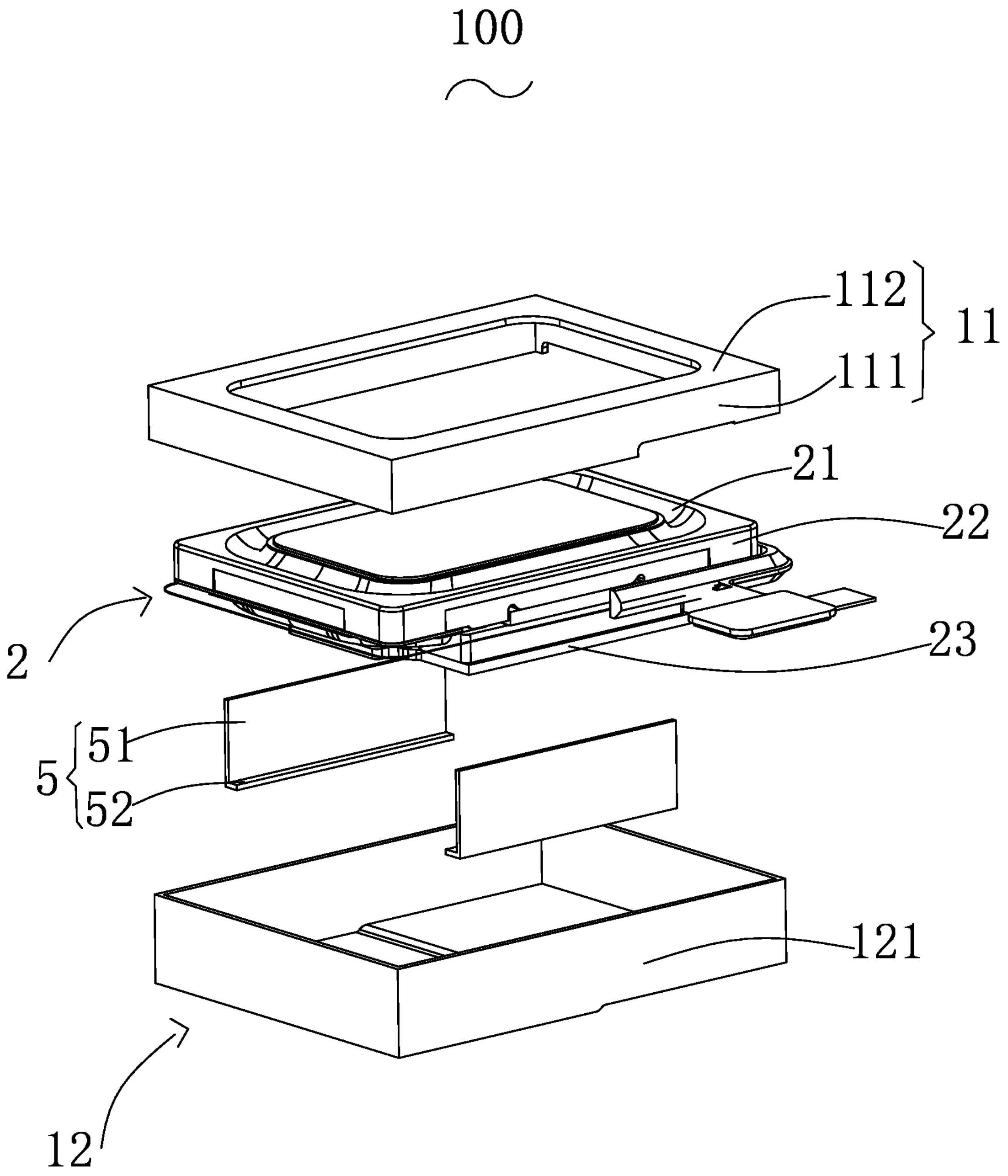
FIG. 2 is an exploded schematic diagram of portions of the speaker box of the present disclosure.
Figure 3:
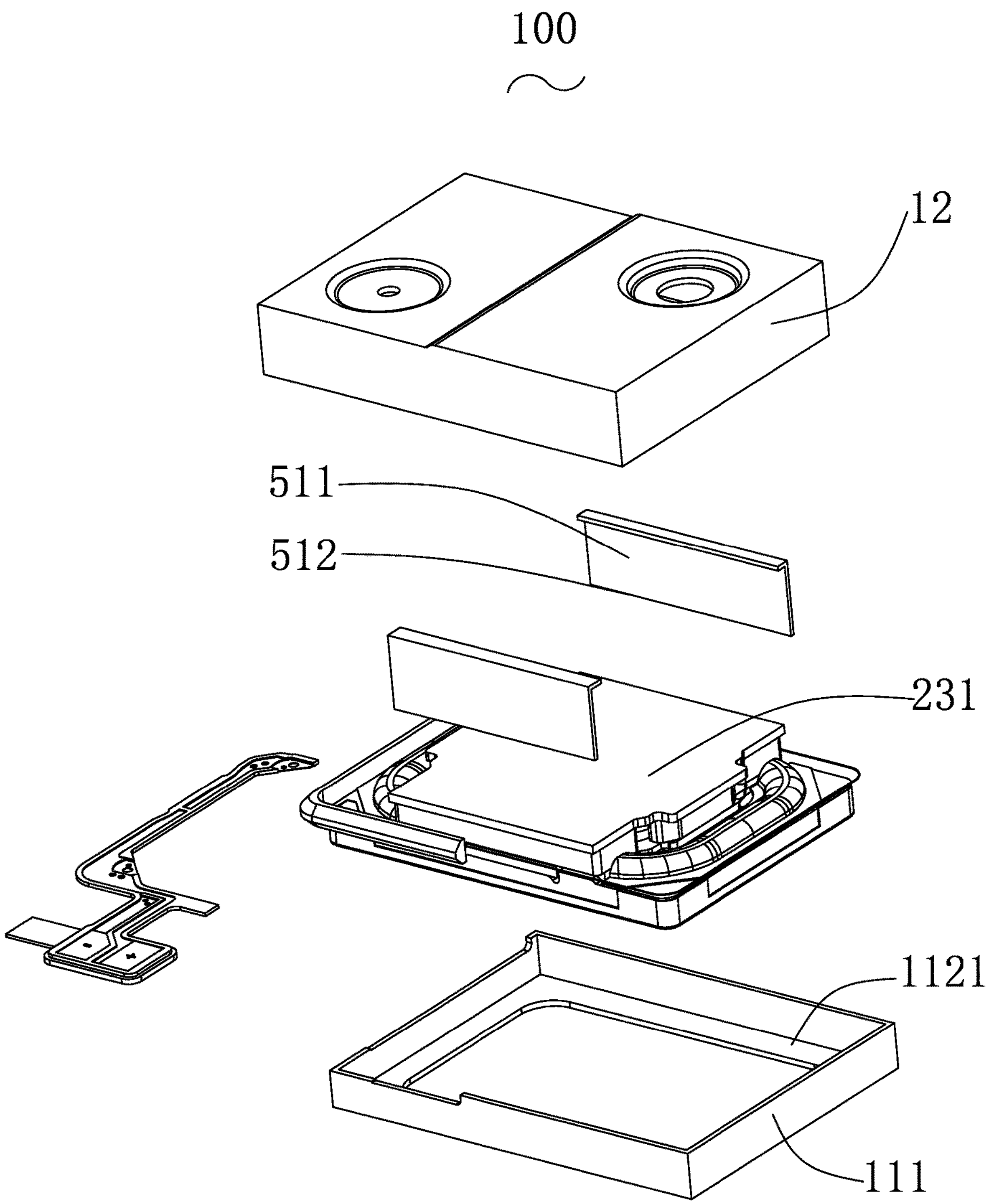
FIG. 3 is another exploded schematic diagram of portions of the speaker box of the present disclosure.
Figure 4:
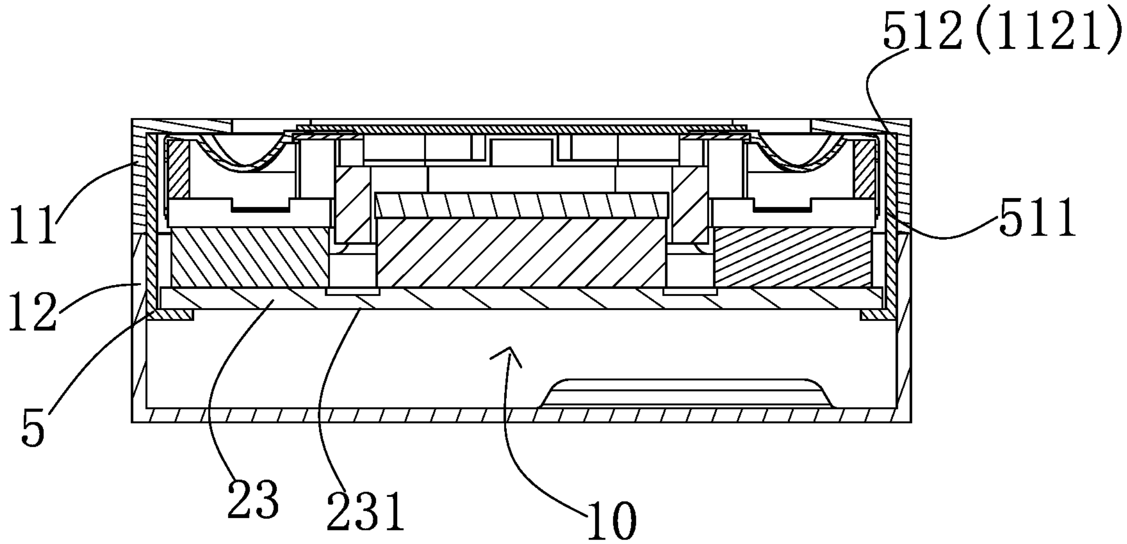
FIG. 4 is a cross-sectional schematic diagram taken along the line A-A in FIG. 1.

As shown in FIGS. 1-4, the present disclosure provides a speaker box 100. The speaker box 100 comprises a metal housing 1 defining an accommodating cavity 10, a speaker 2 received in the accommodating cavity 10, and at least two metal pieces 5 arranged between the metal housing 1 and the speaker 2.

The metal housing 1 comprises an upper housing 11 and a lower housing 12. The upper housing 11 is connected to the lower housing 12 to define the accommodating cavity 10.

The speaker 2 comprises a frame 22, a magnetic yoke 23 fixed to a first side of the frame 22, and a vibrating diaphragm 23 fixed to a second side of the frame 22. The magnetic yoke 23 comprises a lower surface 231 away from the vibrating diaphragm 21.

The at least two metal pieces 5 are welded and fixed to the magnetic yoke 23 and the metal housing 1 through laser. A first side of each of the metal pieces is welded to the magnetic yoke 23 through the laser and a second side of each of the metal pieces is welded to the metal housing 1 through the laser. The upper housing 11 is closer to the vibrating diaphragm 21 than the lower housing 12. The upper housing 11 comprises a first side wall 111 arranged parallel to a vibration direction of the vibrating diaphragm 21. The lower housing 12 comprises a second side wall 121 connected to the first side wall 111. Each of the metal pieces 5 comprises a main body portion 51 and an extending portion 52. Each main body portion 51 is at least partially arranged between the speaker and the first side wall. Each extending portion 52 bends inwardly from one side of a corresponding main body portion 51 away from the vibrating diaphragm 21. Each extending portion is fixed on the lower surface 231 of the magnetic yoke 23 away from the vibrating diaphragm 21. Each main body portion 51 is fixedly connected to the first side wall 111.

In the embodiment, each main body portion 51 is fixedly connected to the first side wall 111 and the second side wall 121 to further enhance fixing effect. In other embodiments, each main body portion 51 may be fixedly connected to the first side wall only. In the embodiment, each main body portion 51 is arranged parallel to the vibration direction of the vibrating diaphragm 21, and each extending portion is arranged perpendicular to the vibration direction of the vibrating diaphragm 21. In other embodiments, in order to match different shapes and functions of the speaker and the metal housing, each main body portion and each extending portion may be arranged in other directions.

Each main body portion 51 comprises a first surface 511 close to the magnetic yoke 23. The first surface 511 of each main body portion 51 is spaced apart from the magnetic yoke 23. In other embodiments, the first surface 51 of each main body portion is fixedly connected to the magnetic yoke 23 to improve connection reliability.

In the embodiment, the speaker 2 is substantially rectangular, and there are two metal pieces 5. The two metal pieces 5 are arranged on two opposite sides of the speaker 2 along a short axis direction of the speaker 2. In other embodiments, there may be three, four, or more metal pieces according to a shape of the speaker, a weight of the speaker, and a material of the speaker.

The upper housing 11 further comprises a top wall 112 bent and extended inwardly from one side of the first side wall away from the second side wall along a direction perpendicular to the vibration direction of the vibrating diaphragm. The top wall 112 comprises an upper surface 1121 close to the vibrating diaphragm. The upper surface 1121 of the top wall is perpendicular to the vibration direction of the vibrating diaphragm. Each main body portion 51 comprises an end surface 512 arranged opposite to the upper surface 1121 of the top wall 112. The end surface 512 of each main body portion 51 is fixedly connected to the upper surface 1121 of the top wall 112. The end surface 512 of each main body portion 51 and the upper surface 1121 of the top wall 112 are flat. In other embodiments, the end surface 512 of each main body portion 51 and the upper surface 1121 of the top wall 112 may be spaced apart.

In the embodiment, the two metal pieces 5 are made of steel. In other embodiments, the metal pieces 5 are made of other materials according to material changes of the magnetic yoke and the metal housing.

Compared with the prior art, the speaker box 100 of the present disclosure comprises the at least two metal pieces, and the at least two metal pieces are welded and fixed with the metal housing and the magnetic yoke of the speaker, so that the speaker and the metal housing are firmly fixed. Compared with the prior art, a support foam configured to support the speaker is eliminated, which optimizes a manufacturing process and saves costs. By welding the metal housing with the speaker through laser, reliability of the speaker box is improved when the speaker box suddenly drops.

The above are only the embodiments of the present disclosure. It should be pointed out that for those of ordinary skill in the art, improvements can be made without departing from the inventive concept of the present disclosure, and these improvements fall within the protection scope of the present disclosure.

What is claimed is:

1. A speaker box, comprising:
a metal housing defining an accommodating cavity;
a speaker received in the accommodating cavity; and
at least two metal pieces arranged between the metal housing and the speaker;
wherein the speaker comprises a vibrating diaphragm, a frame, and a magnetic yoke fixed to the frame; the at least two metal pieces are welded and fixed to the magnetic yoke and the metal housing;
wherein the metal housing comprises an upper housing closest to the vibrating diaphragm and a lower housing away from the vibrating diaphragm; the upper housing comprises a first side wall arranged parallel to a vibration direction of the vibrating diaphragm; each of two metal pieces of the at least two metal pieces comprises a main body portion and an extending portion; each main body portion is at least partially arranged between the speaker and the first side wall; each extending portion bends inwardly from one side of a corresponding main body portion away from the vibrating diaphragm; each extending portion is fixed on a lower surface of the magnetic yoke away from the vibrating diaphragm; each main body portion is fixedly connected to the first side wall.

2. The speaker box according to claim 1, wherein two metal pieces are provided; the two metal pieces are arranged on two opposite sides of the speaker along a short axis direction of the speaker.

3. The speaker box according to claim 1, wherein the lower housing comprises a second side wall connected to the first side wall; each main body portion is fixedly connected to the second side wall.

4. The speaker box according to claim 3, wherein each main body portion is parallel to the vibration direction of the vibrating diaphragm; each extending portion is perpendicular to the vibration direction of the vibrating diaphragm.

5. The speaker box according to claim 4, wherein each main body portion comprises a first surface fixed to the magnetic yoke.

6. The speaker box according to claim 5, wherein the upper housing further comprises a top wall bent and extended inwardly from one side of the first side wall away from the second side wall along a direction perpendicular to the vibration direction of the vibrating diaphragm; the top wall comprises an upper surface close to the vibrating diaphragm; the upper surface of the top wall is perpendicular to the vibration direction of the vibrating diaphragm; each main body portion comprises an end surface arranged opposite to the upper surface of the top wall; and the end surface of each main body portion is fixedly connected to the upper surface of the top wall.

7. The speaker box according to claim 1, wherein the at least two metal pieces are made of steel.

* * * * *